(12) United States Patent
Takase et al.

(10) Patent No.: US 9,760,630 B2
(45) Date of Patent: Sep. 12, 2017

(54) GENERATION OF SYNONYM LIST FROM EXISTING THESAURUS

(71) Applicant: INTERNATIONAL BUSINESS MACHINES CORPORATION, Armonk, NY (US)

(72) Inventors: Toshiro Takase, Tokyo (JP); Akira Koseki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 14/827,051

(22) Filed: Aug. 14, 2015

(65) Prior Publication Data

US 2017/0046428 A1    Feb. 16, 2017

(51) Int. Cl.
*G06F 17/21* (2006.01)
*G06F 17/30* (2006.01)

(52) U.S. Cl.
CPC .... *G06F 17/30737* (2013.01); *G06F 17/3069* (2013.01); *G06F 17/30699* (2013.01)

(58) Field of Classification Search
CPC ........... G06F 17/2795; G06F 17/30672; G06F 17/30867; G06F 17/30976
USPC ......... 704/10; 706/12, 50, 20; 707/706, 728, 707/741, 765, 769
See application file for complete search history.

(56) References Cited

U.S. PATENT DOCUMENTS

| | | |
|---|---|---|
| 7,330,811 B2 | 2/2008 | Turcato et al. |
| 2010/0198821 A1* | 8/2010 | Loritz ................. G06F 17/2795 707/728 |
| 2013/0031097 A1 | 1/2013 | Sutter et al. |
| 2013/0086058 A1 | 4/2013 | Lupu et al. |
| 2013/0238315 A1 | 9/2013 | Lund et al. |
| 2015/0081276 A1 | 3/2015 | Gerard et al. |

OTHER PUBLICATIONS

Bond, F. et al., "Japanese WordNet," National Institute of Information and Communications Technology, retrieved Jul. 13, 2015. (1 page). Available at: http://compling.hss.ntu.edu.sg/wnja/index.en.html.

(Continued)

*Primary Examiner* — Charlotte M Baker
(74) *Attorney, Agent, or Firm* — Tutunjian & Bitetto, P.C.; Vazken Alexanian

(57) ABSTRACT

A computer-implemented method, system, and computer program product for generating a synonym list from an existing thesaurus includes preparing a first feature vector from a natural language query and preparing a second feature vector from a result of the natural language query, determining, using a processor, whether a combination of a first feature from the first feature vector and a second feature from the second feature vector is included as a synonym pair in the existing thesaurus, and generating the synonym list by adding the combination to the synonym list when the determination is positive. The result of the natural language query may be identified by a user browsing action or by a positive feedback from a user. The method further includes reading a log which includes a single set or plural sets of the natural language query and the result of the natural language query.

20 Claims, 10 Drawing Sheets

(56) References Cited

OTHER PUBLICATIONS

Turcato, D., "Adapting a Synonym Database to Specific Domains," Proceedings of ACL 2000 Workshop on Information Retrieval and Natural Language Processing, Oct. 2000. (pp. 1-11).
Yates, A. et al., "Relevance-Ranked Domain-Specific Synonym Discovery," Advances in Information Retrieval, Apr. 2014. (pp. 1-12).

* cited by examiner

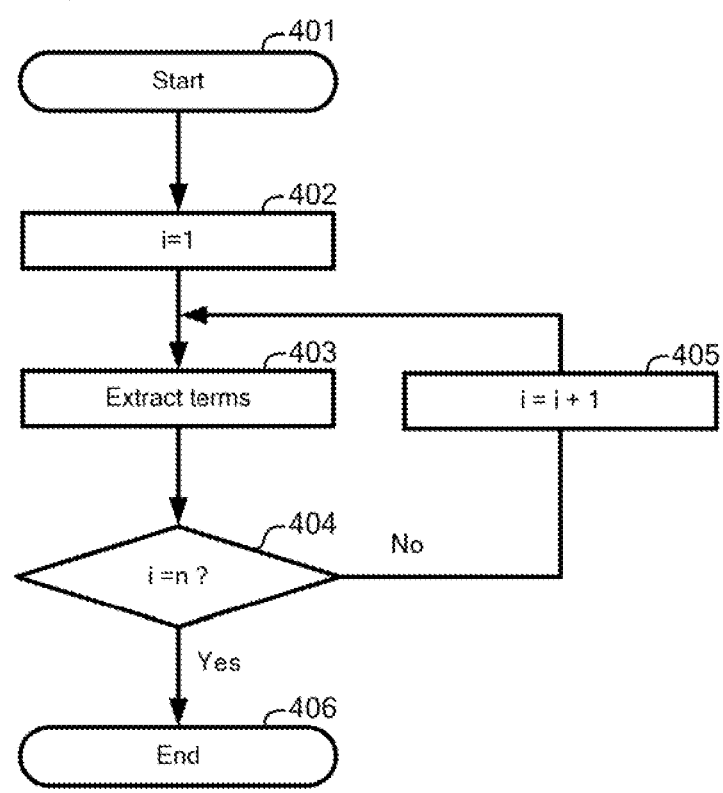

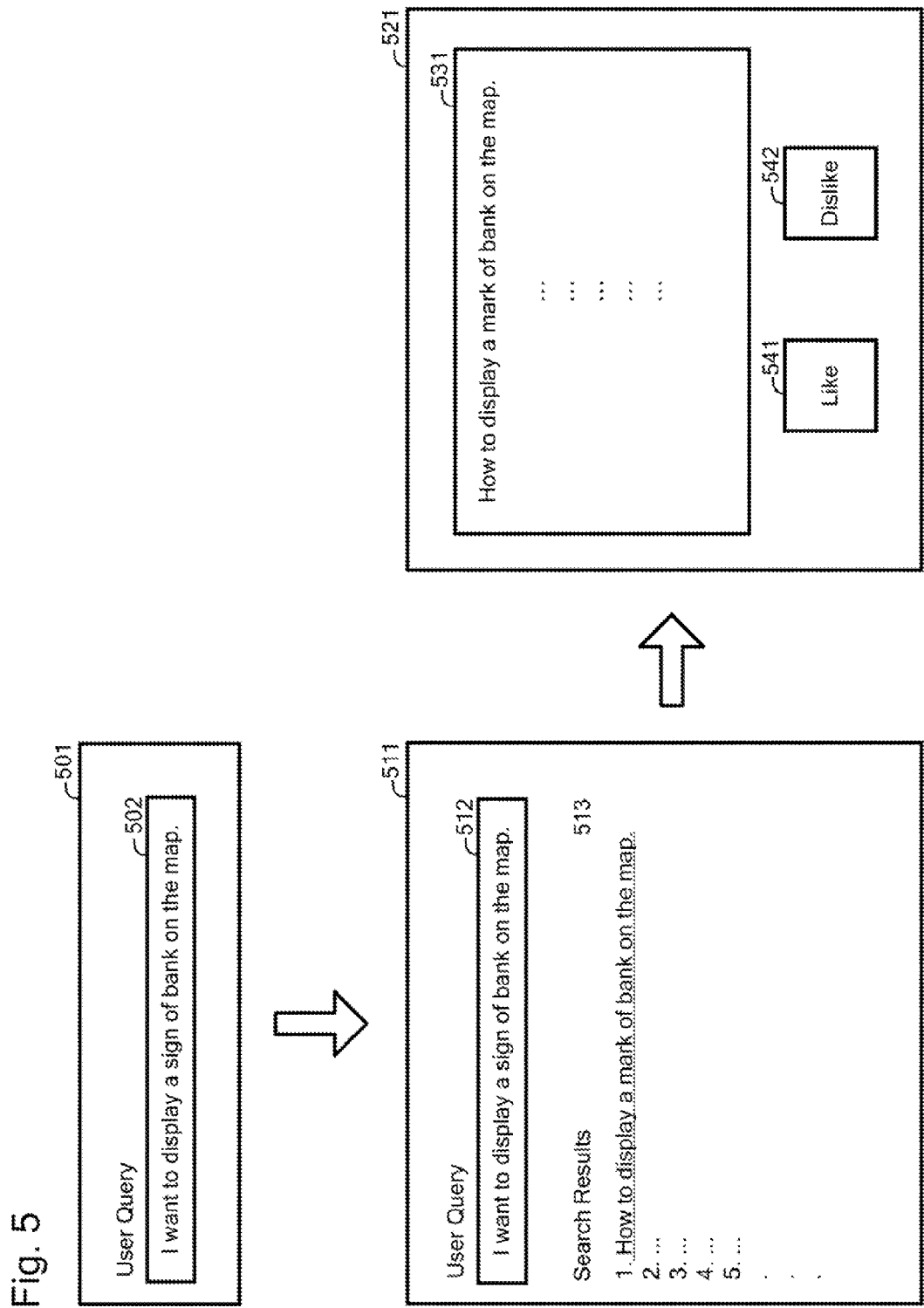

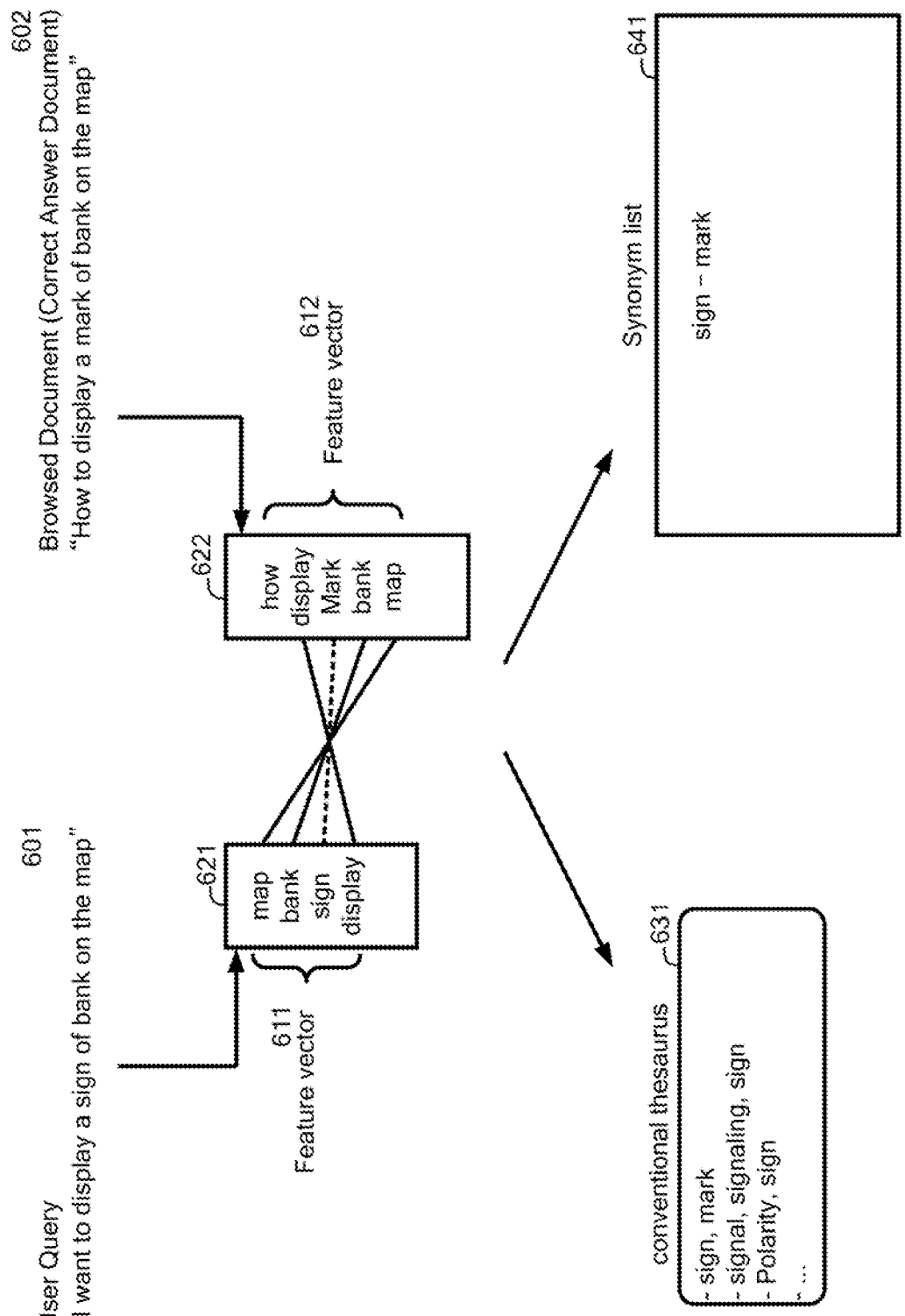

Fig. 7 conventional thesaurus — 701

Noun
- S: (n) sign, mark (a perceptible indication of something not immediately apparent (as a visible clue that something has happened)) "he showed signs of strain"; "they welcomed the signs of spring"
- S: (n) sign (a public display of a message) "he posted signs in all the shop windows"
- S: (n) signal, signaling, sign (any nonverbal action or gesture that encodes a message) "signals from the boat suddenly stopped"
- S: (n) signboard, sign (structure displaying a board on which advertisements can be posted) "the highway was lined with signboards"
- S: (n) sign of the zodiac, star sign, sign, mansion, house, planetary house ((astrology) one of 12 equal areas into which the zodiac is divided)
- S: (n) sign ((medicine) any objective evidence of the presence of a disorder or disease) "there were no signs of asphyxiation"
- S: (n) polarity, sign (having an indicated pole (as the distinction between positive and negative electric charges)) "he got the polarity of the battery reversed"; "charges of opposite sign"
- S: (n) augury, sign, foretoken, preindication (an event that is experienced as indicating important things to come) "he hoped it was an augury"; "it was a sign from God"
- S: (n) sign (a gesture that is part of a sign language)
- S: (n) sign (a fundamental linguistic unit linking a signifier to that which is signified) "The bond between the signifier and the signified is arbitrary"--de Saussure
- S: (n) sign (a character indicating a relation between quantities) "don't forget the minus sign"

Verb
- S: (v) sign, subscribe (mark with one's signature; write one's name (on)) "She signed the letter and sent it off"; "Please sign here"
- S: (v) sign, ratify (approve and express assent, responsibility, or obligation) "All parties ratified the peace treaty"; "Have you signed your contract yet?"
- S: (v) sign (be engaged by a written agreement) "He signed to play the casino on Dec. 18"; "The soprano signed to sing the new opera"
- S: (v) sign, contract, sign on, sign up (engage by written agreement) "They signed two new pitchers for the next season"
- S: (v) sign, signal, signalize, signalise (communicate silently and non-verbally by signals or signs) "He signed his disapproval with a dismissive hand gesture"; "The diner signaled the waiters to bring the menu"
- S: (v) sign (place signs, as along a road) "sign an intersection"; "This road has been signed"
- S: (v) sign (communicate in sign language) "I don't know how to sign, so I could not communicate with my deaf cousin"
- S: (v) bless, sign (make the sign of the cross over someone in order to call on God for protection; consecrate)

Adjective
- S: (adj) gestural, sign, signed, sign-language (used of the language of the deaf)

http://wordnetweb.princeton.edu/perl/webwn

GENERATION OF SYNONYM LIST FROM EXISTING THESAURUS

BACKGROUND

Technical Field

The present invention relates to a synonym list, and more specifically, to a generation of a synonym list from an existing thesaurus.

Background Art

For calculating information retrieval scores using natural languages, such as using Frequency Asked Questions, FAQ, similarity search engine, etc., appropriately registering synonyms significantly affects the precision of information retrieval.

Simply using a general thesaurus, such as a lexical database, may lead to a low retrieval precision or an increase in computation time for a specific environment because it has a myriad of possible synonyms, some of which are not suitable for the situation. For example, WordNet (URL: http://compling.hss.ntu.edu.sg/wnja/index.en.html) is well known for the lexical database, in which nouns, verbs, adjectives and adverbs are grouped into sets of cognitive synonyms (synsets).

To create and maintain an appropriate list of synonyms by hand is very costly, while it is becoming easy to collect information retrieval logs.

SUMMARY

According to one aspect of the present invention, an embodiment of the present invention provides a computer-implemented method for generating a synonym list from an existing thesaurus. The method includes preparing a first feature vector from a natural language query and preparing a second feature vector from a result of the natural language query, determining, using a processor, whether a combination of a first feature from the first feature vector and a second feature from the second feature vector is included as a synonym pair in the existing thesaurus, and generating the synonym list by adding the combination to the synonym list when the determination is positive.

In one embodiment, the preparing of a first feature vector from a natural language query may include generating a first feature vector from the natural language query and the preparing of a second feature vector from a result of the natural language query may include generating a second feature vector from the result of the natural language query.

In another embodiment, the preparing of a first feature vector and a second feature vector may include reading a log which includes a single set or plural sets of the natural language query and the result of the natural language query and further includes a first feature vector from the natural language query and a second feature vector from the result of the natural language query.

In another embodiment, the preparing of a first feature vector and a second first vector may include reading a log which includes a single set or plural sets of the natural language query and the result of the natural language query and, then, generating a first feature vector from the natural language query and generating a second feature vector from the result of the natural language query.

According to another aspect of the present invention, a computer system comprising a computer readable storage medium storing a program of instructions executable by the computer system to perform one or more methods described herein may be provided.

According to another aspect of the present invention, a computer program product comprising a computer readable storage medium storing a program of instructions executable by the computer system to perform one or more methods described herein also may be provided.

These and other features and advantages will become apparent from the following detailed description of illustrative embodiments thereof, which is to be read in connection with the accompanying drawings.

BRIEF DESCRIPTION OF THE DRAWINGS

FIGS. 4A and 4B illustrate embodiments of flowcharts of methods for generating a feature vector, in accordance with the present principles;

FIG. 5 illustrates one embodiment of a window for inputting a natural language query and a window for inputting a user feedback, in accordance with the present principles;

FIG. 6 illustrates one embodiment of the generation of a synonym list from a conventional thesaurus, in accordance with the present principles;

FIG. 7 illustrates one embodiment of a conventional thesaurus, in accordance with the present principles;

DETAILED DESCRIPTION OF THE EMBODIMENTS

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
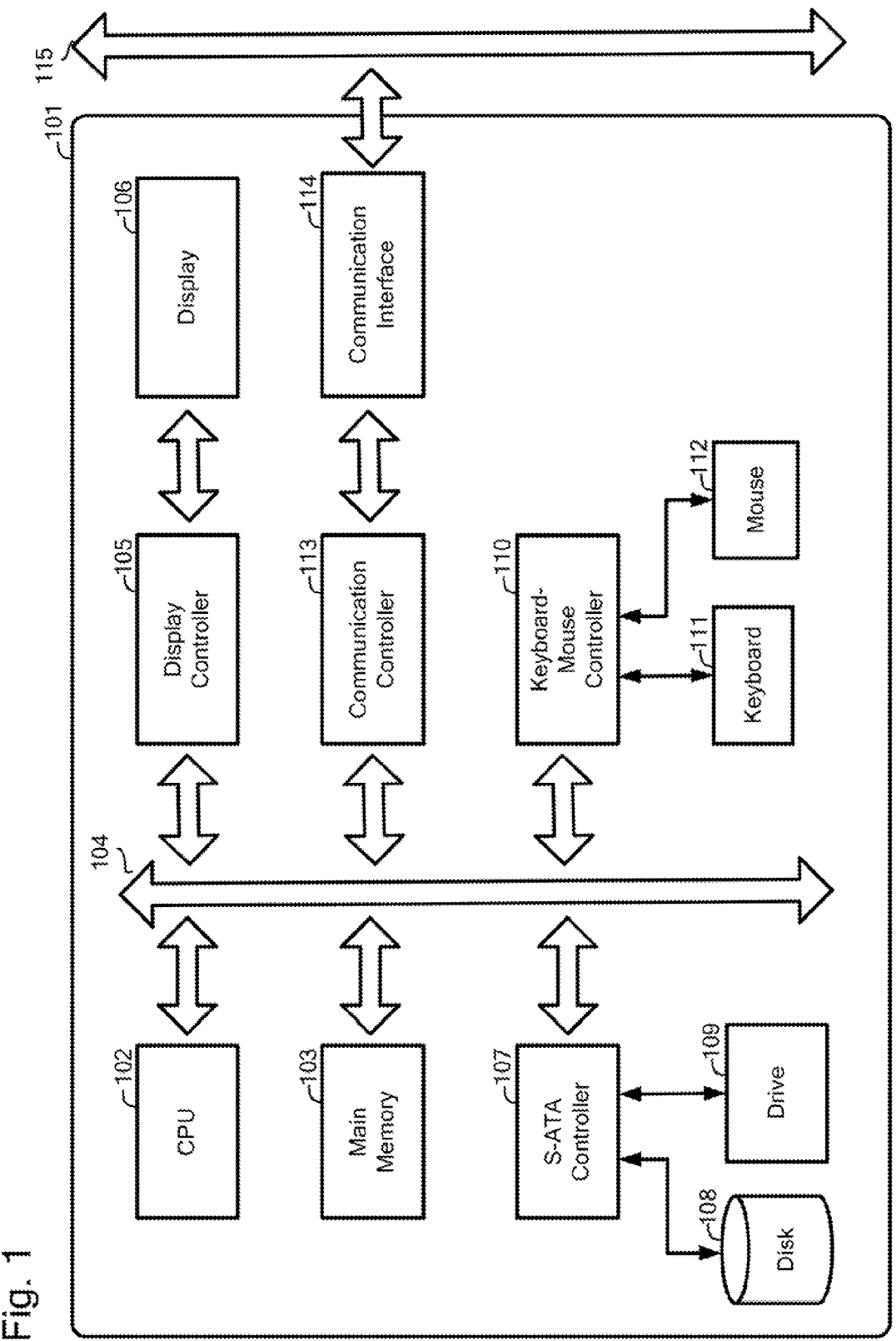
FIG. 1 illustrates an exemplified block diagram of a computer hardware used in an embodiment of the present invention.

With reference now to FIG. 1, FIG. 1 illustrates an exemplified block diagram of a computer hardware used in an embodiment of the present invention.

A computer (101) may be, for example, but is not limited to, a desktop, a laptop, a notebook, a tablet or a server computer. The server computer may be, for example, but is not limited to, a workstation, a rack-mount type server, a blade type server, or a mainframe server and may run, for example, a hypervisor for creating and running one or more virtual machines. The computer (101) may comprise one or more CPUs (102) and a main memory (103) connected to a bus (104). The CPU (102) may be preferably based on a 32-bit or 64-bit architecture. The CPU (102) may be, for example, but is not limited to, the Power® series of International Business Machines Corporation; the Core I™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106) such as a liquid crystal display (LCD) may be connected to the bus (104) via a display controller (105). The display (106) may be used to display, for management of the computer(s), information on a computer connected to a network via a communication line and information on software running on the computer using an appropriate graphics interface. A disk (108) such as a hard disk or a solid state drive, SSD, and a drive (109) such as a CD, a DVD, or a BD (Blu-ray disk) drive may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

Figure 2:
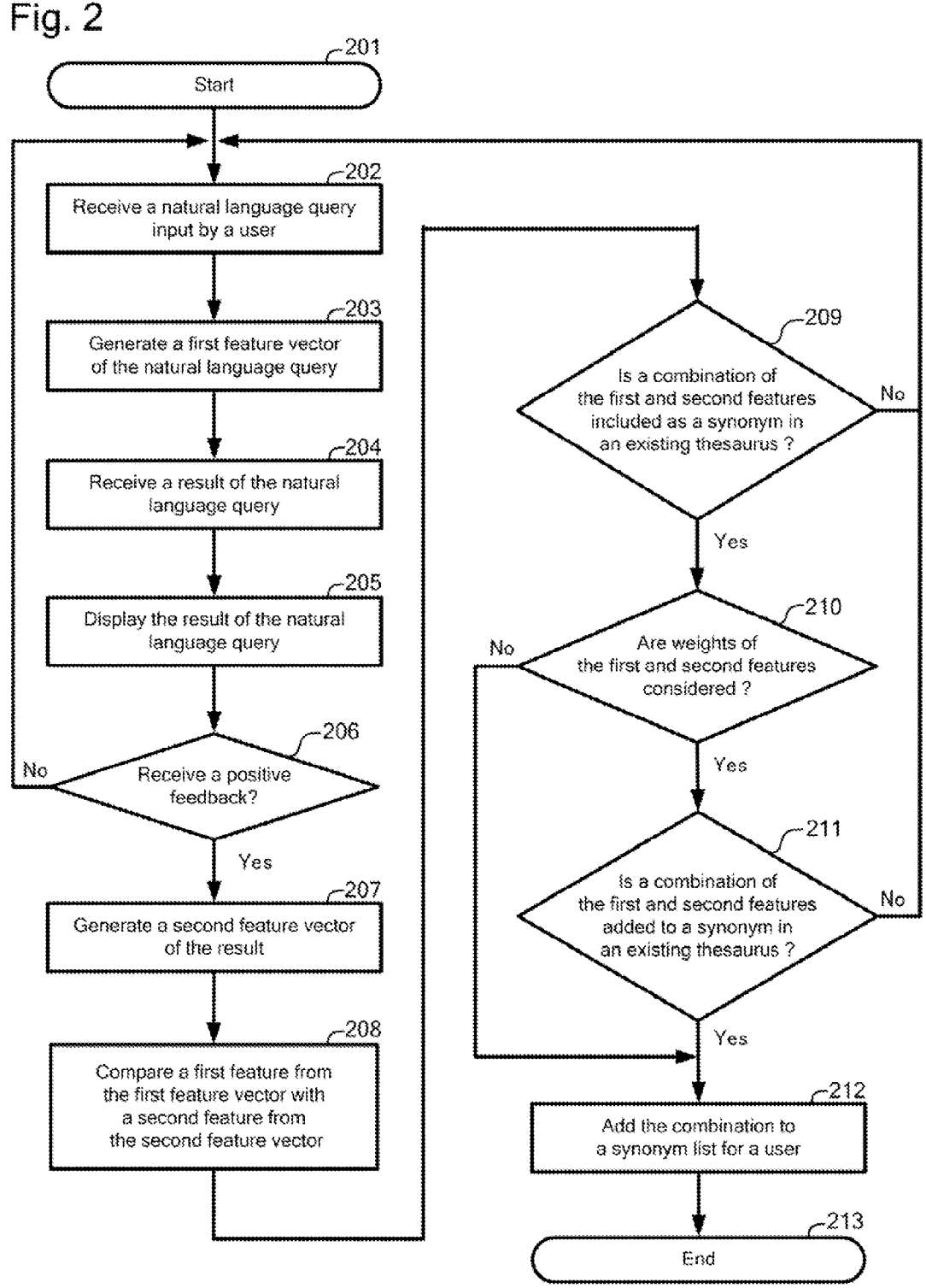
FIG. 2 illustrates one embodiment of a flowchart of a method for generating a synonym list from an existing thesaurus, in accordance with the present principles.

With reference now to FIG. 2, FIG. 2 illustrates one embodiment of a flowchart of a method for generating a synonym list from an existing thesaurus.

A system, such as the computer (101) of FIG. 1, may perform the method described in FIG. 2. The system may be implemented as a single computer or a plurality of computers.

In block 201, the system starts the method for generating a synonym list from an existing thesaurus.

In block 202, the system receives a natural language query input by a user via a browser to an application for search. The natural language query may be inputted by for example, but not limited to, a software or hardware keyboard, a mouse, speech recognition application. Different natural language queries may be prepared or selected depending on a type of a synonym list created by a desire of a user or administrator.

In response to receiving the natural language query, the system sends the natural language query to a server from which a result of the natural language query is retrieved. The server may be for example, but not limited to an information retrieval server.

In block 203, the system generates a first feature vector of the natural language query.

In one embodiment, the first feature vector may be a list having features $F_1, \ldots F_j$, hereinafter also referred to as a first feature, appearing in the natural language query or extracted from the natural language query. The first feature may be for example, but not limited to, a term or a phrase, an acronym, such as who, when where, what, why (5Ws) and how (1H), or a question category which is extracted from the entire query. Any method known to the art for calculating a feature vector may be used for the first feature vector. One embodiment of the generation of the first feature vector above is explained in FIG. 4A mentioned below.

In another embodiment, the first feature vector may be a vector having, as elements, a pair of a feature $F_j$, hereinafter also referred to as a first feature, appearing in the natural language query and weight $W_{ij}$, hereinafter also referred to as a first weight, of the first feature $F_j$. The first feature may be one as described above. The number of elements depends on the natural language query. The first weight is optionally used, in block 211 described in FIG. 2 or block 308 described in FIG. 3, for judging whether a combination of a first feature and a second feature (the second feature being generated in step 207 described below) is added to a synonym in an existing thesaurus. The first weight is associated with the first feature and may be used in blocks 210 and 211 mentioned below. Any method known in the art for calculating a feature vector may be used for the first feature vector. One embodiment of the generation of the first feature vector together with the weight is explained in FIG. 4B described below.

In block 204, the system receives a result of the natural language query, sent from the server. The system may receive the result via a browser from an application for search. The result may be for example, but not limited to, a document(s), a passage(s) or a term(s). The result may be also a natural language.

The methods of the blocks 203 and 204 can be performed in parallel or in order of the blocks 203 and 204, or vice versa.

In block 205, the system displays the result of the natural language query, for example, on a window of the browser or the application for search. Further, the system may display the window or new window for inputting a user feedback associated with the result. If the user thinks that the result is favorable, she or he may press a positive button, for example, but not limited to, "helpful", "like", "recommended", "good" or "favorable" button. While, if the user thinks that the result is unfavorable, she or he may press a negative button of, for example, but not limited to, "not helpful", "dislike", "bad" or "unfavorable" button.

In block 206, the system judges whether a positive feedback is received or not. If the judgment is positive, the system proceeds with block 207. Otherwise, the system returns to block 202.

When the judgment is positive, the result of the natural language query is deemed to be an answer document.

In block 207, the system generates a second feature vector of the result of the natural language query, and more specifically the answer document obtained from block 206.

In one embodiment, the second feature vector of the answer document may be a list having features $F_1, \ldots, F_j$, hereinafter also referred to as a second feature, appearing in the result or extracted from the result. The second features may be for example, but not limited to, a term, a phrase, or an answer category which is extracted from the entire result. Any method known in the art for calculating a feature vector may be used for the second feature vector. One embodiment of the generation of the second feature vector above is explained in FIG. 4A described below.

In another embodiment, the second feature vector may be a vector having, as elements, a pair of a feature $F_j$, hereinafter also referred to as a second feature, appearing in the result or extracted from the result and weight $W_{ij}$, hereinafter also referred to as a second weight, of the second feature. The second feature may be one as described above. The number of elements depends on the result(s) of the natural language query. The second weight is optionally used, in block 211 described in FIG. 2 or block 308 described in FIG. 3, for judging whether a combination of a first feature and a second feature is added to a synonym in an existing thesaurus. The second weight is associated with the second feature and may be used in blocks 210 and 211, as described below. Any method known in the art for calculating a feature vector may be used for the second feature vector. One embodiment of the generation of the second feature vector together with the weight is explained in FIG. 4B described below.

In block 208, the system compares a first feature from the first feature vector provided in block 203 with a second feature from the second feature vector provided in block 207.

In one embodiment, the system selects one feature in the first feature vector and compares the selected feature with all features in the second feature vector or compares the selected feature with the feature in the second feature vector until a combination of the selected feature and the feature in the second feature vector is found as a synonym in an existing thesaurus. The system repeats the selection of the feature in the first feature vector and the comparison of the selected feature with the feature in the second feature vector, until the selection and the comparison is done for each of all features in the first feature vector.

In another embodiment, the system selects one feature in the second feature vector and compares the selected feature with all features in the first feature vector or compares the selected feature with the feature in the first feature vector until a combination of the selected feature and the feature in the first feature vector is found as a synonym in an existing thesaurus. The system repeats the selection of the feature in the second feature vector and the comparison of the selected feature with the feature in the first feature vector, until the selection and the comparison is done for each of all features in the second feature vector.

In block 209, the system determines whether or not a combination of the first and the second features is included as a synonym in an existing thesaurus.

The existing thesaurus may be an existing listing of terms, phrases and a combination thereof grouped and classified to help select the right word or phrase to convey a specific nuance of meaning. The existing thesaurus may be for example, but not limited to, thesaurus which can be obtainable by WordNet. The existing thesaurus is also referred to as conventional thesaurus or general thesaurus. Any existing thesaurus can be used for an embodiment of the present invention.

In one embodiment, the system determines whether or not a combination of the feature selected from the first feature vector with a feature in the second feature vectors is included as a synonym in the existing thesaurus.

In another embodiment, the system determines whether or not a combination of the feature selected from the second feature vector with a feature in the first feature vectors is included as a synonym in the existing thesaurus.

If the judgment is positive, the system proceeds to block 210, where blocks 210 to 211 are performed. Otherwise, the system returns to block 202.

In optional block 210, the system determines whether weights of the first and second features are considered or not. If the judgment is positive, optionally, the system may further change the weight of the first weight of the first feature, the second weight of the second feature, or combination thereof.

The system may change a first weight of the first feature, the second weight of the second feature, or combination thereof as follows. In one embodiment, when a frequency of a first or second feature is higher, the system may reduce a weight of a first or second feature having high frequency. In another embodiment, when a first or second feature has rarity, the system may increase a weight of a first or second feature having rarity. In another embodiment, the system may change the weight of a first or second feature, depending on a part of speech called such as a noun, a verb, a pronoun, an adjective, an adverb, a preposition, a conjunction, an interjection or an exclamation. For example, when a part of speech of a first or second feature is a noun, the computer may increase a weight of a first or second feature having the noun, while when a part of speech of a feature is an exclamation, the computer may decrease a weight of a first or second feature having the exclamation.

If the judgment is positive, the system proceeds to block 211. Otherwise, the system proceeds to block 212.

In block 211, the system determines whether a combination of the first and second feature is added to a synonym in an existing thesaurus or not. In one embodiment, let us suppose that each of a first and second feature vectors has a word together with a weight of the word. In such a case, when either or both of two words which correspond to a combination of the first and second features have the first or second weight having a very small value which is lower than a predetermined threshold, the system may not add the combination to the synonym list. This is because if such combination is added to the synonym list and the synonym list including such combination is used for or installed in a search system, a side effect may occur in view of an improvement of an accuracy of the natural language query.

If the judgment is positive, the system proceeds to block 212. Otherwise, the system returns to block 202.

In block 212, the system adds the combination to a synonym list for a user or a synonym list for a specific technical field or a specific user or group. The synonym list, where the combination is added, is prepared or selected depending on a query or a result of the query. Accordingly, a different type of synonym list can be made according to a specific technical field or the specific user or group to which the query or result relates. In natural language applications, such as translation machines, the instant methods reduce computation time over conventional techniques and produce an improved synonym list by registering synonyms to improve thesauruses. In addition, the instant methods provide synonym lists with increased retrieval precision to make query searches more accurate, less computationally intensive and faster.

The specific technical field may be, for example, but not limited to, pharmaceutical, medical, electronic, mechanical, biological, chemical, chemical-engineering, biological, food, or legal or intellectual property fields.

The specific user or group may be, for example, but not limited to, a unit of a company, a department, an organization, a specific industry such as newspaper industry, a call center, or a user support.

In an embodiment, block 212 may include determining a synonym using the combination in the synonym list with increased computational efficiency. The method in FIG. 2 may increase at least one of computational efficiency and/or retrieval precision in comparison to using other techniques using a conventional thesaurus. For example, by using the synonym list, a synonym for a word may be determined more efficiently because the synonym list includes relevant and/or user-defined synonyms. Computational efficiency may be increased as the instant methods provide less computation time.

A relevant and/or user-defined synonym may include synonyms that are specific to a specific technical field or a specific user or group, and may exclude synonyms that are not appropriate and/or not relevant to a specific technical field or a specific user or group. Accordingly, relevant and/or user-defined synonyms may include synonyms which are relevant to pharmaceutical, medical, electronic, mechanical, biological, chemical, chemical-engineering, biological, food, or legal or intellectual property fields. In addition, relevant and/or user-defined synonyms may include synonyms which are relevant to a unit of a company, a department, an organization, a specific industry such as newspaper industry, a call center, or a user support.

In an embodiment, the synonym list generated in block 212 may be stored in a storage device, such as the main memory (103) or the disk (108) of FIG. 1. The system (101) of FIG. 1 may obtain the synonym list from a storage accessible by a user computer or a server computer.

In block 213, the system terminates the process for generating a synonym list from an existing thesaurus.

In FIG. 2, a step of generating a second feature vector is performed after block 206. In another embodiment, a step of generating a second feature vector is performed between blocks 204 and 205. In such case, the system generates a second feature vector of all the received result(s) of the natural language query.

Through the flowchart described in FIG. 2, the system can obtain an appropriate list of synonym automatically from the existing thesaurus.

Figure 3:
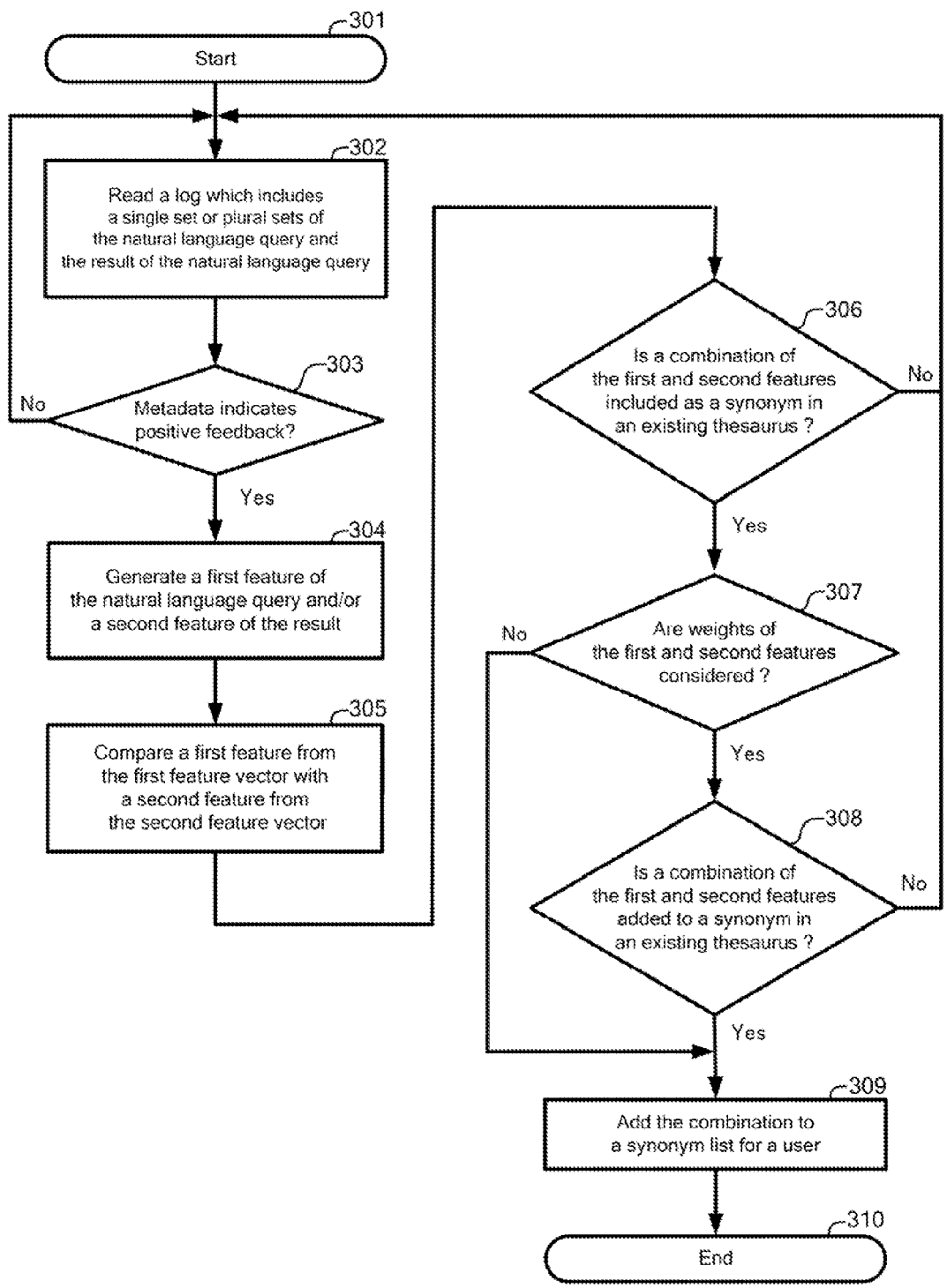
FIG. 3 illustrates another embodiment of a flowchart of a method for generating a synonym list from an existing thesaurus, in accordance with the present principles.

With reference now to FIG. 3, FIG. 3 illustrates another embodiment of a flowchart of a method for generating a synonym list from an existing thesaurus, where a log which includes a single set or plurality of sets of the natural language query and the result of the natural language query is provided to the system.

A system, such as the computer (101) of FIG. 1, may perform the method described in FIG. 3. The system may be implemented as a single computer or a plurality of computers.

In block 301, the system starts the method for generating a synonym list from an existing thesaurus.

In block 302, the system reads a log which includes a single set or a plurality of sets of the natural language query and the result of the natural language query. The log may further include a first feature vector generated from the natural language query and a second feature vector generated from the result of the natural language query. The result of the natural language may be, for example, but not limited to, a document(s), a passage(s) or a term(s). The result may be also a natural language. Further, the system reads metadata which indicates a positive feedback or non-positive feedback from the user. The metadata is associated with the result. The metadata may be included in the log or in a file which is different from the log file.

The system may obtain the log from a storage accessible by a user computer where the natural language query is input or from a storage accessible by a server computer where the natural language query is received and the result of the natural language query is retrieved.

In block 303, the system determines whether the metadata indicates a positive feedback or not. If the judgment is positive, the system proceeds to block 304. Otherwise, the system returns to block 302.

In block 304, the system generates a first feature vector of the natural language query, if the log does not have the first feature vector. Similarly, the system generates a second feature vector of the result, if the log does not have the second feature vector.

The blocks 305 to 309 in FIG. 3 correspond to the blocks 208 to 212 in FIG. 2, respectively. Accordingly, the explanation of blocks 208 to 212 is applied to blocks 305 to 309, respectively.

In block 310, the system terminates the process for generating a synonym list from an existing thesaurus.

Figure 4B:
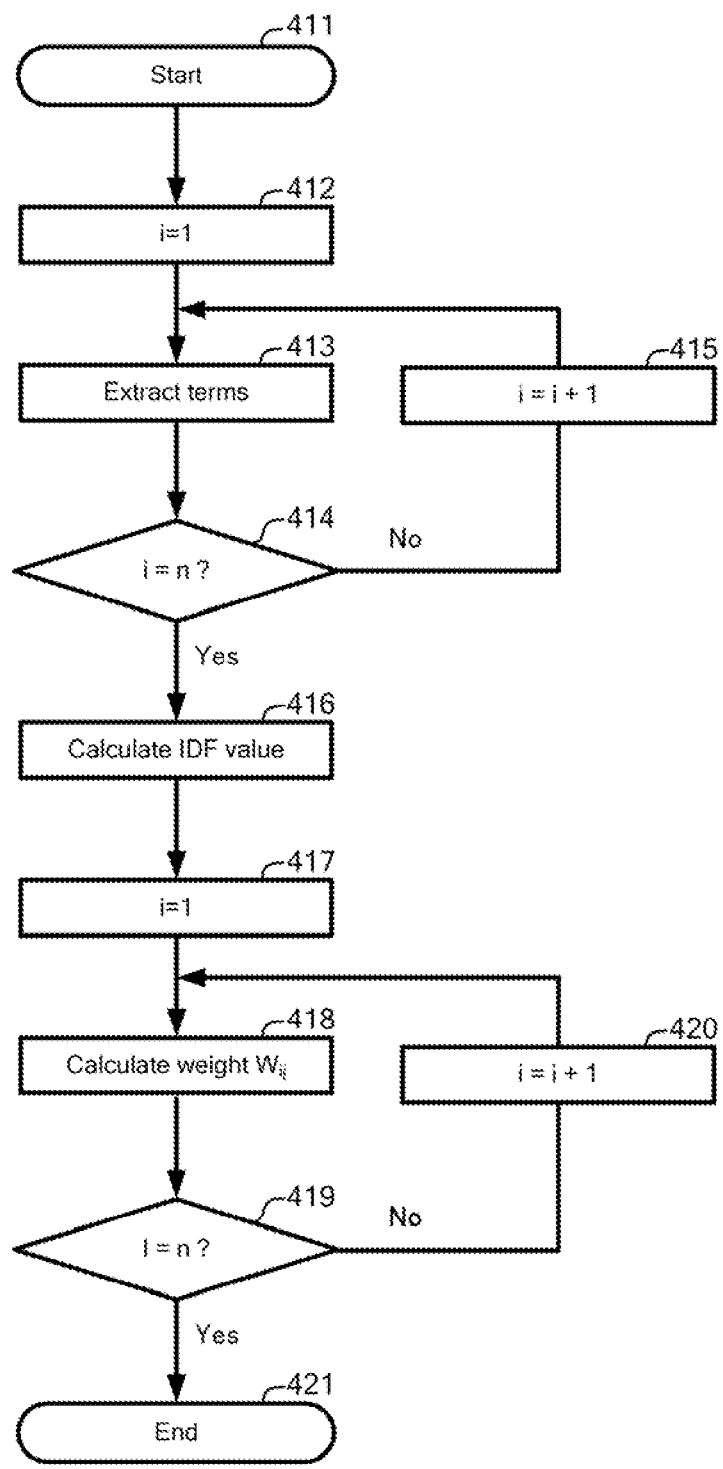

With reference now to FIGS. 4A and 4B, FIGS. 4A and 4B illustrate embodiments of flowcharts of a method for calculating a first or second feature vector, where a feature of the feature vector is a term.

FIG. 4A illustrates the flowchart for generating a feature vector having terms $T_1, \ldots, T_j$, where j denotes the number of the terms, appearing in the natural language query or the result of the natural language query.

In block 401, the system starts the method for calculating the feature vector.

In block 402, the system sets a term counter as i=1.

In block 403, the system extracts terms from the natural language query by a known method such as morphemic analysis, syntactic analysis, and removal of unnecessary terms, and, optionally, the frequency $F_{ij}$ of the term $T_j$ appearing in the natural language query Di or the result Di of the natural language query is counted. The number of documents is indicated as n, where n≥1. If the document is the natural language query, the number of documents n may be 1. If the document is the result of the natural language query, the number of documents n depends on the number of the result with a positive feedback or the number of the results of the natural language query. The relation of i and n is indicated as $1 \leq i \leq n$.

In block 404, the system determines whether or not the processing in block 402 has been completed for all natural language queries or all result(s) of the natural language query. If completed, that is, i=n, the system proceeds to block 406. Otherwise, the system proceeds to block 405.

In block 405, the system increments the term counter, i=i+1, and returns to block 403.

In block 406, the system terminates the process for calculating the feature vector.

FIG. 4B illustrates the flowchart for generating a feature vector having as elements a pair of a term $T_j$, where j denoting the number of the terms, appearing in the natural language query or the result of the natural language query and weight $W_{ij}$ of the term $T_j$.

In block 411, the system starts the method for calculating the feature vector.

The blocks 412 to 414 described in FIG. 4B correspond to blocks 402 to 404 described in FIG. 4A, respectively. Accordingly, the explanations of blocks 402 to 404 are applied to blocks 412 to 414, respectively. The frequency $F_{ij}$ of the term $T_j$ appearing in the natural language query Di or the result Di of the natural language query may be used for calculating weight described in block 418 described below.

In block 416, the system calculates the inverse document frequency (IDFj), according to the equation (1) below:

$$IDF_j = \log \frac{n}{Mj} + 1, \quad (1)$$

where n denotes the number of the documents and Mj denotes the number of the natural language queries which contain the term $T_j$.

In block 417, the system sets a query counter as i=1.

In block 418, the system calculates weight $W_{ij}$, e.g., a TFIDF value, by multiplying $F_{ij}$, e.g., a term frequency (TF), representing the rate of appearance of the term $T_j$ in the natural language query Di by the IDF value described above, from the equation (2) below:

$$W_{ij} = (F_{ij} / \Sigma_{j:T_j \in D_i} F_{ij}) \cdot IDF_j$$

where the term $T_j$ characterizes the natural language query Di or the result of the natural language query Di with the weight $W_{ij}$.

In block 419, the system determines whether the processing in block 418 has been completed for all the natural language queries or not. If completed, that is, i=n, the system proceeds to block 421. Otherwise, the system proceeds to block 420.

In block 420, the system increments the query counter, i=i+1, and returns to block 418.

In block 421, the system terminates the process for calculating the feature vector.

With reference now to FIG. 5, FIG. 5 illustrates one embodiment of a window for inputting a natural language query and a window for inputting a user feedback.

The window (501) shows an input field (502) for inputting a user query. The user query may be a natural language query.

The window (511) shows an input field (512) and a search result (513) of the user query. The search result (513) shows the titles of the documents. When a user clicks a title of the document by, for example, a mouse, the system retrieves a clicked document from, for example, a server.

The window (521) shows the retrieved document (531). Further, the window (521) shows the "like button" (541) and "dislike button" (542). If the user clicks the like button (541), the system recognizes that a positive feedback is returned. While, if the user click the dislike button (542), the system recognizes that a negative feedback is returned.

In one embodiment, in response to a receipt of the positive feedback, the system compares a first feature vector of the search query with a second feature of the result, or the retrieved document (531).

In another embodiment, in response to a receipt of a user browsing action for example, but not limited to a user click of the title, the system compares a first feature vector of the search query with a second feature of the clicked title in the search results (512).

With reference now to FIG. 6, FIG. 6 illustrates one embodiment of the generation of a synonym list from a conventional thesaurus.

For example, a user inputs a user query (601), "I want to display a sign of bank on the map."

In response to a receipt of the user query (601), the system generates a first vector for the user query (601). The system generates a first vector (621) comprising the features or terms, "map", "bank", "sign" and "display" (611).

The system receives a result of the user query (601) and shows that result on a display (106) of FIG. 1.

In another example, suppose that the document "How to display a mark of bank on the map" was browsed by the user. The system recognizes that the browsed document as a correct answer document.

In response to receiving positive feedback for the browsed document, the system generates a second vector (622) comprising the features or terms, "how", "display", "mark", "bank" and "map" (612).

The system selects the term, "map", in the first feature vector (611), and further selects the term in the second feature vector (612) in sequence. The system determines whether or not a combination of the selected term, "map" and the sequentially selected terms "how", "display", "mark", "bank" and "map" is included as synonym in a conventional thesaurus (631). As a result, the system cannot find the combination in the conventional thesaurus (631).

Similarly, the system selects the term, "bank", in the first feature vector (611), and further selects the term in the second feature vector (612) in sequence. The system determines whether or not a combination of the selected term, "bank" and the selected terms "how", "display", "mark", "bank" or "map" is included as synonym in a conventional thesaurus (631). As a result, the system cannot find the combination in the conventional thesaurus (631).

Similarly, the system selects the term, "sign", in the first feature vector (611), and further selects the term in the second feature vector (612) in sequence. The system determines whether or not a combination of the selected term, "sign" and the selected terms "how", "display", "mark", "bank" or "map" is included as synonym in a conventional thesaurus (631). As a result, the system can find the combination of "sign" and "mark" in the conventional thesaurus (631). In one embodiment, at the time when the system finds the combination, the system may stop the comparison of the term, "sign", and the remaining terms, "bank" and "map".

Similarly, the system selects the term, "display", in the first feature vector (611), and further selects the term in the second feature vector (612) in sequence. The system determines whether or not a combination of the selected term, "map" and the selected terms "how", "display", "mark", "bank" and "map" is included as synonym in a conventional thesaurus (631). As a result, the system cannot find the combination in the conventional thesaurus (631).

The system adds the combination of the terms, "sign" and "mark" to a synonym list (641).

The synonym list for a user may be used for or installed in a search system and enable an improvement of an accuracy of the natural language query.

With reference now to FIG. 7, FIG. 7 illustrates one embodiment of a conventional thesaurus.

The screen (701) shows the thesaurus of the term, "sign".

The conventional thesaurus has many possible synonyms of "sign". Accordingly, it is quite impractical for a search system to use such possible synonyms in the conventional thesaurus.

Figure 8:
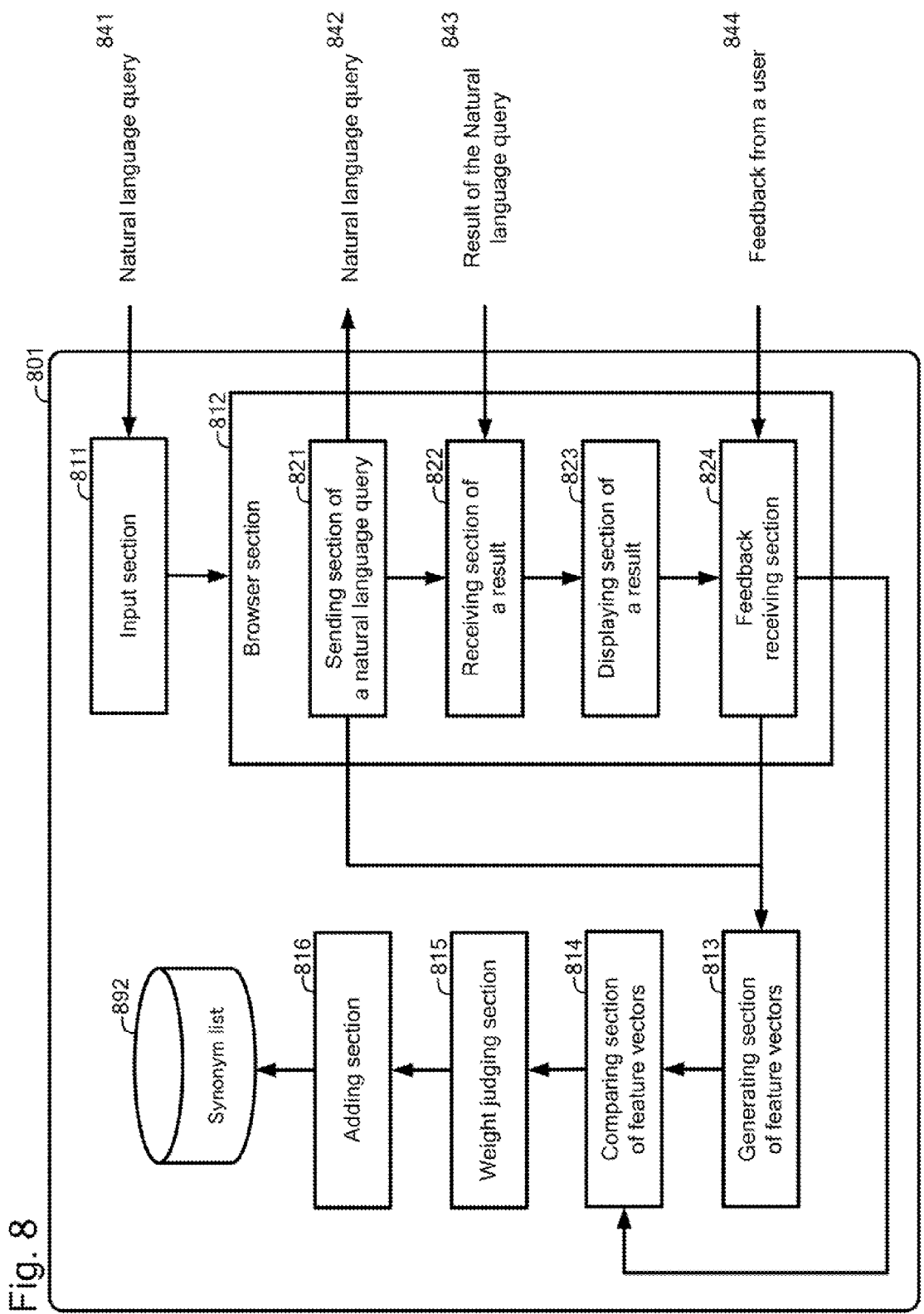
FIG. 8 illustrates one embodiment of an overall functional block diagram of a computer system hardware used in accordance with the embodiment of the flowchart described in FIG. 2.

With reference now to FIG. 8, FIG. 8 illustrates one embodiment of an overall functional block diagram of a computer system hardware used in accordance with the embodiment of the flowchart described in FIG. 2.

The system (801) corresponds to the computer (101) described in FIG. 1.

The system (801) comprises an input section (811), a browser section (812), a generating section of feature vectors (813), a comparing section of feature vectors (814), a weight judging section (815) and an adding section (816).

The input section (811) receives a natural language query (841) which was inputted by a user via a browser to an application for search.

The input section (811) may perform block 202 described in FIG. 2.

The browser section (812) comprises a sending section of a natural language query (821), a receiving section of a result (822), a displaying section of a result (823) and a feedback receiving section (824).

The sending section of a natural language query (821) sends the natural language query (842) to a server from which a result of the natural language query is retrieved.

The receiving section of a result (822) receives a result (843) of the natural language query, which was sent from the server.

The receiving section of a result (822) may perform block 204 described in FIG. 2.

The displaying section of a result (823) displays the result of the natural language query, for example on a window of the browser or the application for search. Further, the displaying section of a result (823) may display the window or new window for inputting a user feedback associated with the result.

The displaying section of a result (823) may perform block 205 described in FIG. 2.

The feedback receiving section (824) receives a positive or negative feedback from a user (844). In response to a receipt of the positive feedback, the feedback receiving section (824) sends a notice of receiving the positive feedback to the comparing section of feature vectors (814).

The feedback receiving section (824) may perform block 206 described in FIG. 2.

The generating section of feature vectors (813) generates a first feature vector of the natural language query (841) and a second feature vector of the result (843).

The generating section of feature vectors (813) may perform blocks 203 and 207 described in FIG. 2.

The comparing section of feature vectors (814) compares a first feature from the first feature vector with a second feature from the second feature vector and, then, determines whether or not a combination of the first and the second features is included as a synonym in an existing thesaurus The comparing section of feature vectors (814) may perform blocks 208 and 209 described in FIG. 2.

The weight judging section (815) determines whether weights of the first and second features are considered or not. Further, the weight judging section (815) determines whether a combination of the first and second feature is added to a synonym in an existing thesaurus or not.

The weight judging section (815) may perform blocks 210 and 211 described in FIG. 2.

The adding section (816) receives the combination from the comparing section of feature vectors (814), if the judgment is positive, and, then, adds the combination to a synonym list for a user (892).

The adding section (816) may perform may perform block 212 described in FIG. 2.

Figure 9:
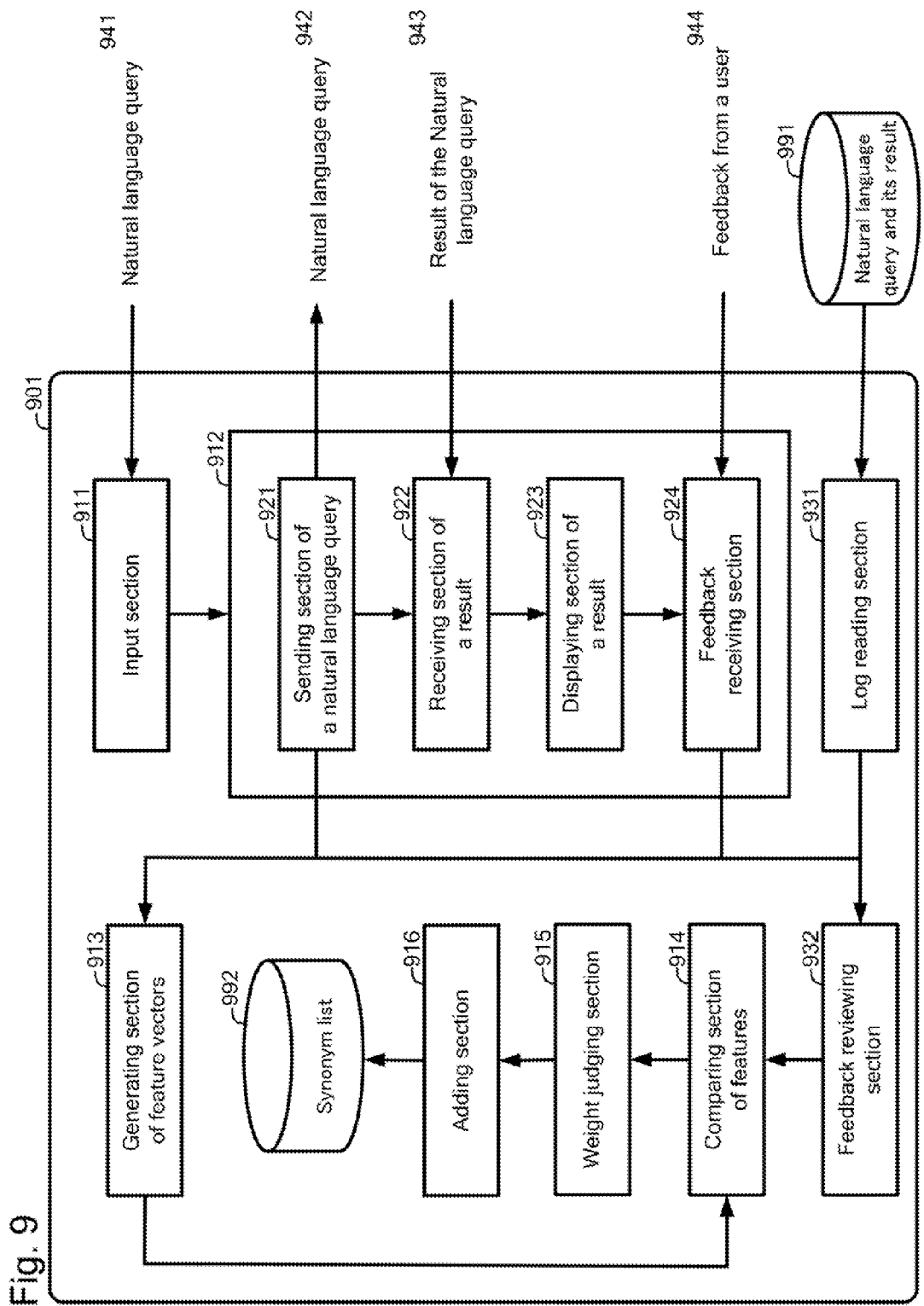
FIG. 9 illustrates another embodiment of an overall functional block diagram of a computer system hardware used in accordance with the embodiment of the flowchart described in FIG. 3.

With reference now to FIG. 9, FIG. 9 illustrates another embodiment of an overall functional block diagram of a computer system hardware used in accordance with the embodiment of the flowchart described in FIG. 3.

The system (901) corresponds to the computer (101) described in FIG. 1.

The system (901) comprises a log reading section (931), a feedback reviewing section (932), a comparing section of feature vectors (914), a weight judging section (915) and an adding section (916).

Optionally, the system may comprise an input section (911), a browser section (912) and a generating section of feature vectors (913).

The log reading section (931) reads a log which includes a single set or a plurality of sets of the natural language query and the result of the natural language query. The log may further include a first feature vector generated from the natural language query and a second feature vector generated from the result of the natural language query. The log may be obtained from a storage (991) for storing sets of the natural language query and the result of the natural language query. The log saved in the storage (991) may be saved by the system (901) or other systems (not shown).

The log reading section (931) may perform block 302 described in FIG. 3.

The feedback reviewing section (932) determines whether the metadata indicates a positive feedback or not. If the judgment is positive, the feedback reviewing section (932) sends a notice of receiving the positive feedback to the comparing section of feature vectors (914).

The feedback reviewing section (932) may perform block 303 described in FIG. 3.

The comparing section of feature vectors (914) corresponds to the comparing section of feature vectors (814).

The comparing section of feature vectors (914) may perform blocks 305 and 306 described in FIG. 3.

The weight judging section (915) corresponds to the weight judging section (815).

The weight judging section (915) may perform blocks 307 and 308 described in FIG. 3.

The adding section (916) corresponds to the adding section (816).

The adding section (916) may perform block 309 described in FIG. 3.

The input section (911) corresponds to the input section (811).

The browser section (912) corresponds to the browser section (812). The browser section (912) comprises a sending section of a natural language query (921), a receiving section of a result (922), a displaying section of a result (923) and a feedback receiving section (924).

The sending section of a natural language query (921) corresponds to the sending section of a natural language query (821).

The receiving section of a result (922) corresponds to the receiving section of a result (822).

The displaying section of a result (923) corresponds to the displaying section of a result (823).

The feedback receiving section (924) corresponds to the feedback receiving section (824).

The generating section of feature vectors (913) corresponds to the generating section of feature vectors (813).

The generating section of feature vectors (913) may perform block 304 described in FIG. 3.

The synonym list for a user (992) corresponds to the synonym list for a user (892). The adding section (916) receives the combination from the comparing section of feature vectors (914), if the judgment is positive, and, then, adds the combination to a synonym list for a user (992).

In one embodiment, the feedback receiving section (924) may store a set of the natural language query and the result (943) of the natural language query as a log into the storage (991). In another embodiment, the generating section of feature vectors (913) may store a set of the natural language query and the result (943) of the natural language query together with a first feature vector and a second feature vector as a log into the storage (991).

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "a/one" should be understood as "at least one".

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or". It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

Having described preferred embodiments of a system and method for generating a synonym list from an existing thesaurus (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for generating a synonym list from an existing thesaurus, the method comprising:
   preparing a first feature vector from a natural language query and preparing a second feature vector from a result of the natural language query;
   determining, using a processor, whether a combination of a first feature from the first feature vector and a second feature from the second feature vector is included as a synonym pair in the existing thesaurus; and
   generating the synonym list by adding the combination to the synonym list when the determination is positive.

2. The method according to claim 1, wherein the result of the natural language query is identified by a user browsing action or by a positive feedback from a user.

3. The method according to claim 1, further comprising reading a log which includes a single set or a plurality of sets of the natural language query and the result of the natural language query.

4. The method according to claim 1, wherein the preparation of the first feature vector further comprises preparing, for each first feature, a first weight of the first feature and the preparation of the second feature vector further comprises preparing, for each second feature, a second weight of the second feature; and
   the method further comprising determining whether the combination of the first feature and the second feature is added to the synonym list, using the first weight and the second weight.

5. The method according to claim 4, further comprising changing the first weight of the first feature, the second weight of the second feature, or combination thereof.

6. The method according to claim 1, wherein the synonym list is for a specific purpose.

7. The method according to claim 6, wherein the synonym list for the specific purpose is a synonym list for a specific technical field or a synonym list for a specific user or group.

8. A system, comprising:
   a processor; and
   a memory storing a program, which, when executed on the processor, performs a method for generating a synonym list from a natural language query, the method comprising:
   preparing a first feature vector from a natural language query and preparing a second feature vector from a result of the natural language query;
   determining, using a processor, whether a combination of a first feature from the first feature vector and a second feature from the second feature vector is included as a synonym pair in the existing thesaurus; and
   generating the synonym list by adding the combination to the synonym list when the determination is positive.

9. The system according to claim 8, wherein the result of the natural language query is identified by a user browsing action or by a positive feedback from a user.

10. The system according to claim 8, further comprising:
    reading a log includes a single set or a plurality of sets of natural language query and the result of the natural language query.

11. The system according to claim 8, wherein the preparation of the first feature vector further comprises preparing, for each first feature, a first weight of the first feature and the preparation of the second feature vector further comprises preparing, for each second feature, a second weight of the second feature; and the method further comprising determining whether the combination of the first feature and the second feature is added to the synonym list, using the first weight and the second weight.

12. The system according to claim 11, further comprising changing the first weight of the first feature, the second weight of the second feature, or combination thereof.

13. The system according to claim 8, wherein the synonym list is for a specific purpose.

14. The system according to claim 13, wherein the synonym list for the specific purpose is a synonym list for a specific technical field or a synonym list for a specific user or group.

15. A computer program product for generating a synonym list from a natural language query, the computer program product comprising a non-transitory computer usable storage medium having program instructions embodied therewith, the program instructions executable by a computer to cause the computer to perform a method comprising:

preparing a first feature vector from a natural language query and preparing a second feature vector from a result of the natural language query;

determining, using a processor, whether a combination of a first feature from the first feature vector and a second feature from the second feature vector is included as a synonym pair in the existing thesaurus; and generating the synonym list by adding the combination to the synonym list when the determination is positive.

16. The computer program product according to claim 15, wherein the result of the natural language query is identified by a user browsing action or by a positive feedback from a user.

17. The computer program product according to claim 15, further comprising:

reading a log which includes a single set or a plurality of sets of the natural language query and the result of the natural language query.

18. The computer program product according to claim 15, wherein the preparation of the first feature vector further comprises preparing, for each first feature, a first weight of the first feature and the preparation of the second feature vector further comprises preparing, for each second feature, a second weight of the second feature; and the method further comprising determining whether the combination of the first feature and the second feature is added to the synonym list, using the first weight and the second weight.

19. The computer program product according to claim 18, further comprising changing the first weight of the first feature, the second weight of the second feature, or combination thereof.

20. The computer program product according to claim 15, wherein the synonym list is for a specific purpose.

* * * * *